United States Patent
Anderson

[19]

[11] Patent Number: 5,930,089
[45] Date of Patent: Jul. 27, 1999

[54] HEAD CLEANER FOR LINEAR TAPE DRIVE

[75] Inventor: James C. Anderson, Eagle, Id.

[73] Assignee: Hewlett-Packard Company, Palo Alto, Calif.

[21] Appl. No.: 09/042,323

[22] Filed: Mar. 13, 1998

[51] Int. Cl.⁶ .................................................. G11B 5/41
[52] U.S. Cl. ............................................................ 360/128
[58] Field of Search ...... 360/128; 15/DIG. 12–DIG. 14

[56] References Cited

U.S. PATENT DOCUMENTS

| | | | |
|---|---|---|---|
| 5,136,448 | 8/1992 | Kiriyama et al. | 360/128 |
| 5,453,894 | 9/1995 | Kim et al. | 360/128 |
| 5,463,519 | 10/1995 | Dodt et al. | 360/128 |
| 5,515,223 | 5/1996 | Grittmann et al. | 360/128 |
| 5,701,224 | 12/1997 | Sakui | 360/128 |

FOREIGN PATENT DOCUMENTS

| | | | |
|---|---|---|---|
| 56-93115 | 7/1981 | Japan | 360/128 |
| 62-125565 | 6/1987 | Japan | 360/128 |

*Primary Examiner*—Jefferson Evans

[57] ABSTRACT

A tape drive includes a transducer head, a tape carrier, a tape displacement structure and a cleaning device. The transducer head is configured to read information from a data tape that is received by the tape drive. The tape carrier is configured to deliver a data tape in association with the transducer head along a travel path. The tape displacement structure is configured to bias a received tape away from the transducer head. Finally, the cleaning device is configured to engage the transducer head for cleaning when the data tape is biased from the transducer head. The cleaning device and the transducer head cooperate to enable cleaning of the transducer head without removal of the data tape. A method is also disclosed.

19 Claims, 3 Drawing Sheets

HEAD CLEANER FOR LINEAR TAPE DRIVE

FIELD OF THE INVENTION

This invention relates generally to tape recording and playback systems for magnetic storage devices, and more particularly to a system which uses a head cleaner for a linear tape drive configurable to effect cleaning of a magnetic head or transducer for a recording and playback mechanism.

BACKGROUND OF THE INVENTION

Recording/playback systems for magnetic medium are subject to degradation during use as a result of the accumulation of debris which occurs on the magnetic transducer head(s) of such systems. Transducer heads include magnetic read/write heads and associated read/write elements. Hence, there is a need to periodically clean the magnetic transducer head(s). Accordingly, there exist several techniques for cleaning a magnetic transducer head.

One prior art technique utilizes a separate, dedicated "cleaning cartridge" to perform periodic cleaning of the recording transducer. A "cleaning cartridge" contains a supply of unrecorded abrasive tape that is used to clean one or more magnetic transducer heads. For example, the recording heads found on a tape drive can be cleaned with a "cleaning cartridge". In order to utilize a "cleaning cartridge", the recording/playback of the medium must be stopped, with the data cartridge being removed, and the cleaning cartridge being inserted. The "cleaning cartridge" is then run within the record/playback system so as to clean the recording transducer. Once cleaning is complete, the "cleaning cartridge" is removed, and a data cartridge is reinserted. However, after the "cleaning cartridge" has been used, a new data cartridge may be loaded into the system in order to evaluate the performance of the magnetic transducer head so as to confirm that cleaning has been successfully completed.

Where the magnetic recording/playback system is a tape recording/playback system, the cleaning cartridge includes an abrasive cleaning tape that can cause excessive tape head wear. The abrasiveness of the cleaning tape can be adjusted in order to tailor its effectiveness. If the cleaning tape is made sufficiently effective to thoroughly remove debris from the read/write heads, then the cleaning tape should only be used when it is necessary; otherwise, excessive head wear will result. Such a problem can occur where a piece of abrasive cleaning tape is provided as a leader on a data tape cartridge such that each time a tape is used the leader is used to clean a read/write head. Furthermore, the provision of an abrasive tape leader within a data tape cartridge eventually results in degradation of the abrasive leader from debris accumulating on the cleaning tape. If the abrasive cleaning tape is made sufficiently effective to thoroughly remove debris from a magnetic head, then a routine must be established to limit use of the cleaning tape only when it is necessary.

Where magnetic tape is used to store computer data, the presence of errors represents a significant problem even if the errors occur infrequently. In certain applications, the loss of data requires that a user be able to perform a cleaning operation in response to recognized drop-out errors, but does not immediately prevent use of the equipment prior to cleaning. In some cases, the loss of a single bit of computer data can be of significant importance, and recovery from such an error must be done in a manner that ensures error-free data storage and retrieval. While error correction is possible via error correction algorithms, data loss can still present problems to a user.

One form of magnetic storage comprises existing linear and helical scan tape drives that are used for storage and retrieval of computer data. Such tape drives use a single reel in the form of a magnetic tape cartridge to house the magnetic tape media. A special leader or leader block is attached to the magnetic tape media at one end which enables the tape drive to extract the magnetic tape from the magnetic tape cartridge.

"Tape recorder" is intended to refer to one form of magnetic recording/playback system comprising magnetic tape transcription equipment. Such equipment is understood to include standard tape recorders having fixed or movable heads, as well as arcuate scan and helical scan transcription equipment as is typically used in analog and digital tape recorders. According to one implementation, a linear transcription head is employed, although such invention has application in other tape recording environments. As described here, "transcription" is intended to mean read and/or write operations that are performed with a tape recorder, and is not intended to be limited to a particular use or format for data.

Another prior art technique is found on a typical helical scan tape drive wherein a head cleaning device is built into a mechanism of the tape drive. More particularly, a helical scan tape drive forms a recording method that is used on videotape and digital audio tape (DAT) that runs the tracks diagonally from top to bottom in order to increase the storage capacity. A drum containing read/write heads is used to read/write information in diagonal segments from/onto a segment of magnetic tape. A head cleaner is located on an opposite side of the drum than the tape. In this manner, while data is being written/read, the head cleaner can be concurrently cleaning the heads as they pass by on the drum.

In contrast, a linear tape drive continuously presents a magnetic tape segment in contact with the read/write heads, unless the tape is removed from the tape drive. Hence, linear tape drives typically do not have head cleaners built into the tape drive mechanism. Therefore, a data tape is typically removed when it is determined that the heads have become dirty in order that a cleaning tape cartridge can be loaded into the tape drive to clean debris from the heads. However, such loading/unloading is undesirable because it takes customer intervention and a significant amount of time to spool the tape back into the cartridge. Accordingly, such loading/unloading is slow, cumbersome and is extremely difficult to implement automatically.

One linear tape drive which does have a head cleaner built into the tape drive mechanism is the International Business Machines (IBM) Magstar 3590, sold by IBM Storage Systems Division, 9000 S. Rita Road, Tucson, Ariz. 85744. The IBM Magstar 3590 has a cleaning brush built into the tape drive mechanism such that the cleaning brush is brought into contact with the read/write heads during a tape threading operation. More particularly, as a leader block on a data tape is pulled back into the tape cartridge, the leader block hits a lever which engages the brush against the read/write heads. An actuator moves the heads up and down in order to provide scrubbing action between the brush and heads. However, such cleaning action only takes place after the data tape has been retracted into the data cartridge: Furthermore, it takes time to spool the tape back into the cartridge which causes delay, even before actual brush-to-head cleaning action actually occurs.

It is therefore desirable to employ an improved tape drive cleaning mechanism that is capable of sufficiently cleaning a magnetic head of the system without imparting any significant delay in operation resulting from unwinding a data tape back into a data cartridge before cleaning can begin.

It is further desirable to deliver such cleaning action without having to remove a data tape from a tape drive. Furthermore, there is a desire to deliver cleaning to a head at periodic intervals that substantially coincide with a need to clean debris from a magnetic head.

SUMMARY OF THE INVENTION

The invention provides a device and method for cleaning magnetic heads on a tape drive system. The device comprises a head cleaner for a linear tape drive having a tape displacement structure in the form of a linkage that retracts a data tape away from a transducer head, enabling accessing and cleaning of the head by a cleaning device.

According to one aspect of the invention, a tape drive includes a transducer head, a tape carrier, a tape displacement structure and a cleaning device. The transducer head is configured to read information from a data tape that is received by the tape drive. The tape carrier is configured to deliver a data tape in association with the transducer head along a travel path. The tape displacement structure is configured to bias a received tape away from the transducer head. Finally, the cleaning device is configured to engage the transducer head for cleaning when the data tape is biased from the transducer head. The cleaning device and the transducer head cooperate to enable cleaning of the transducer head without removal of the data tape.

According to another aspect of the invention, a self-cleaning linear tape drive is disclosed. The tape drive includes a magnetic head configured to read information from data tapes that are supported by the tape drive. The tape drive also includes a tape carrier configured to movably support a data tape for travel across the magnetic head extending along a travel path. Furthermore, the tape drive includes a head cleaning device having a tape displacement structure configured to separate a data tape from the magnetic head, and a cleaning apparatus configured to engage the magnetic head for cleaning while the data tape is biased from the transducer head.

According to yet another aspect of the invention, a method is disclosed for cleaning a transducer head of a linear tape drive. The method includes the steps of: presenting a data tape in contact with a transducer head of a tape drive so as to extend along a travel path; urging the data tape away from the transducer head; and in combination with urging the data tape away from the transducer head, cleaning the transducer head.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
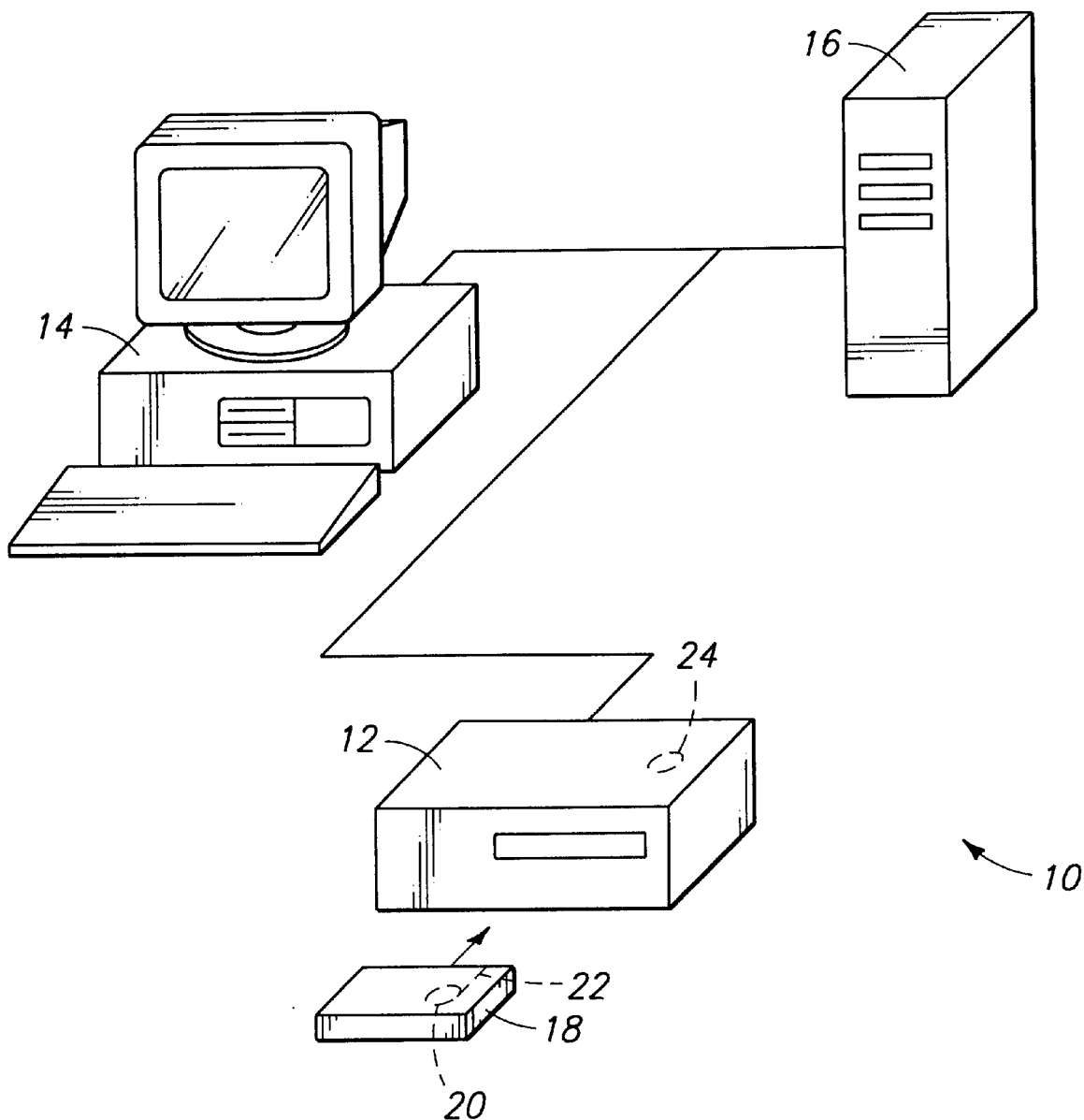
FIG. 1 is a perspective view of a computer system including a linear tape drive data storage device embodying the invention.

FIG. 1 illustrates a computer network environment 10 including a data storage device, or system, 12 embodying this invention, and including a computer 14 and a network server 16. Computer 14 is configured to read data from and write data to data storage device 12. Additionally or optionally, server 16 is configured to read data from and write data to data storage device 12. Computer 14 and network server 16, together or individually, form a host system that is connected with data storage device 12. According to one embodiment, data storage device 12 comprises a data storage/retrieval device configured in the form of a stand-alone computer linear tape drive. According to another embodiment, data storage device 12 is supported in a bay inside a housing of computer 14 or server 16.

As illustrated in FIG. 1, data storage device 12 is a linear recording tape drive. Although the one embodiment illustrated in FIG. 1 is employed in a computer data storing tape drive system, the invention is understood to have a wide variety of applications. For example, certain aspects of the invention can be used in connection with other magnetic storage media, for storing either analog or digital information. Some aspects of the invention can be employed, for example, in connection with any of a variety of types of storage devices having read/write heads, including linear, helical and serpentine tape drives. For purposes of illustration, the invention will be described in connection with a computer linear tape drive.

As shown in FIG. 1, tape drive 12 is configured to be used with tape cartridges such as a data cartridge 18. In the illustrated embodiment, data cartridge 18 is a single-reel type linear tape cartridge. Such tape data cartridge 18 includes a tape carrier in the form of a reel 20, and tape 22 wound onto reel 20. A second reel 24 is included in tape drive 12, and is configured to engage tape 22. Second reel 24 cooperates with first reel 20 to form a tape carrier. According to an alternative construction, data tape cartridge 18 includes two reels. According to one implementation, tape 22 is configured with a width, W, of one-half inch. Such tape 22 has a length extending in a direction perpendicular to width W, with a plurality of parallel tracks being defined across the width of tape 22. Such tracks extend in the direction of the length of tape 22, and are used for storing data as well as storing servo information.

Figure 2:
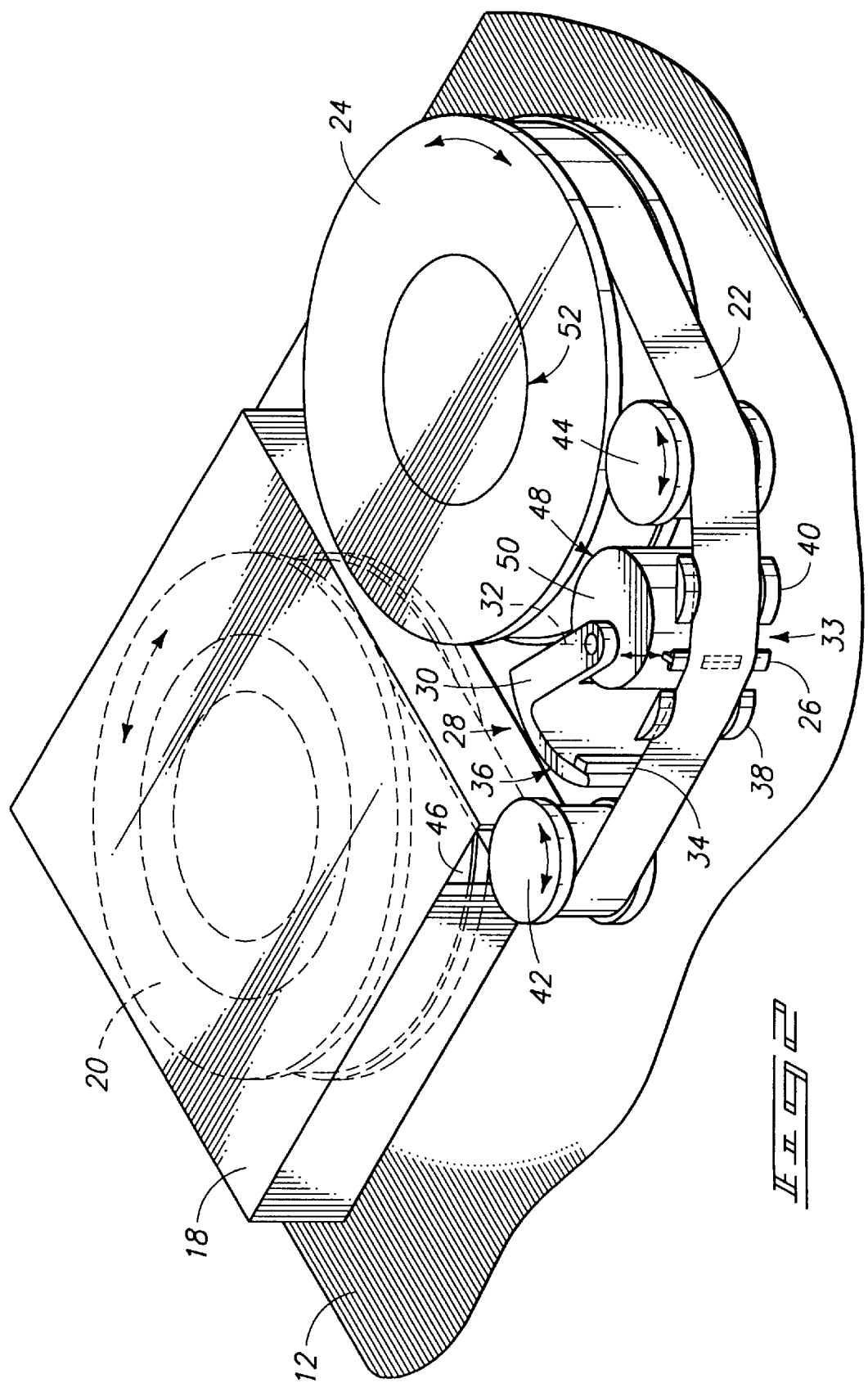
FIG. 2 is a simplified partial perspective view of an inside of a linear tape drive in which a data tape cartridge is received, and showing the cleaning device of this invention provided in association with the tape drive mechanism of the tape drive.

FIG. 2 illustrates the internal operating configuration of tape drive 12 when data cartridge 18 is loaded therein so as to position data tape 22 for linear movement along a magnetic tape head 26. As shown in FIG. 2, computer tape drive 12 includes magnetic tape head 26 which contains a plurality of read/write elements for reading data from or writing data to tape 22 of cartridge 18. Magnetic tape head 26 comprises a transducer head. Additionally, a plurality of servo elements are configured on head 26 for reading/writing servo code from tape 22. Additionally, such servo elements on the tape head are configured for reading/writing servo information as well as data from a portion of tape 22. The performance of individual transducer heads can be tested by writing and reading data from tape 22 in order to verify that head cleaning is required, or that head 26 has been sufficiently cleaned.

FIG. 2 illustrates a head cleaning device 28 configured in one form to include a pivotally supported arm 30, carried for movement about a pivot axis 32, and positioned to displace tape 22 from a travel position, or travel path, 33 along head 26. More particularly, arm 30 supports a cleaning apparatus in the form of a cleaning brush 34 along an inner surface at a location wherein pivotal movement of arm 30 positions brush 34 directly against head 26. A radial outer slider surface 36 on arm 30 slides and mates with tape 22 so as to displace tape 22 from a natural operating travel position 33 against head 26 to a retracted position 35 (see FIG. 3). According to the one construction, support surface 36 forms a cylindrical segment centered about pivot axis 32, as shown in further detail in FIG. 3, configured to slidably engage tape 22.

As shown in FIG. 2, tape 24 exits data cartridge 18 along an exit aperture 46 where the tape travels around roller guides 42 and 44, as well as stationary guides 38 and 40. Transducer head 26 is positioned between stationary guides 38 and 40 such that travel tension is applied to transducer head 26 by tape 22 during normal operation of tape drive 12.

Figure 3:
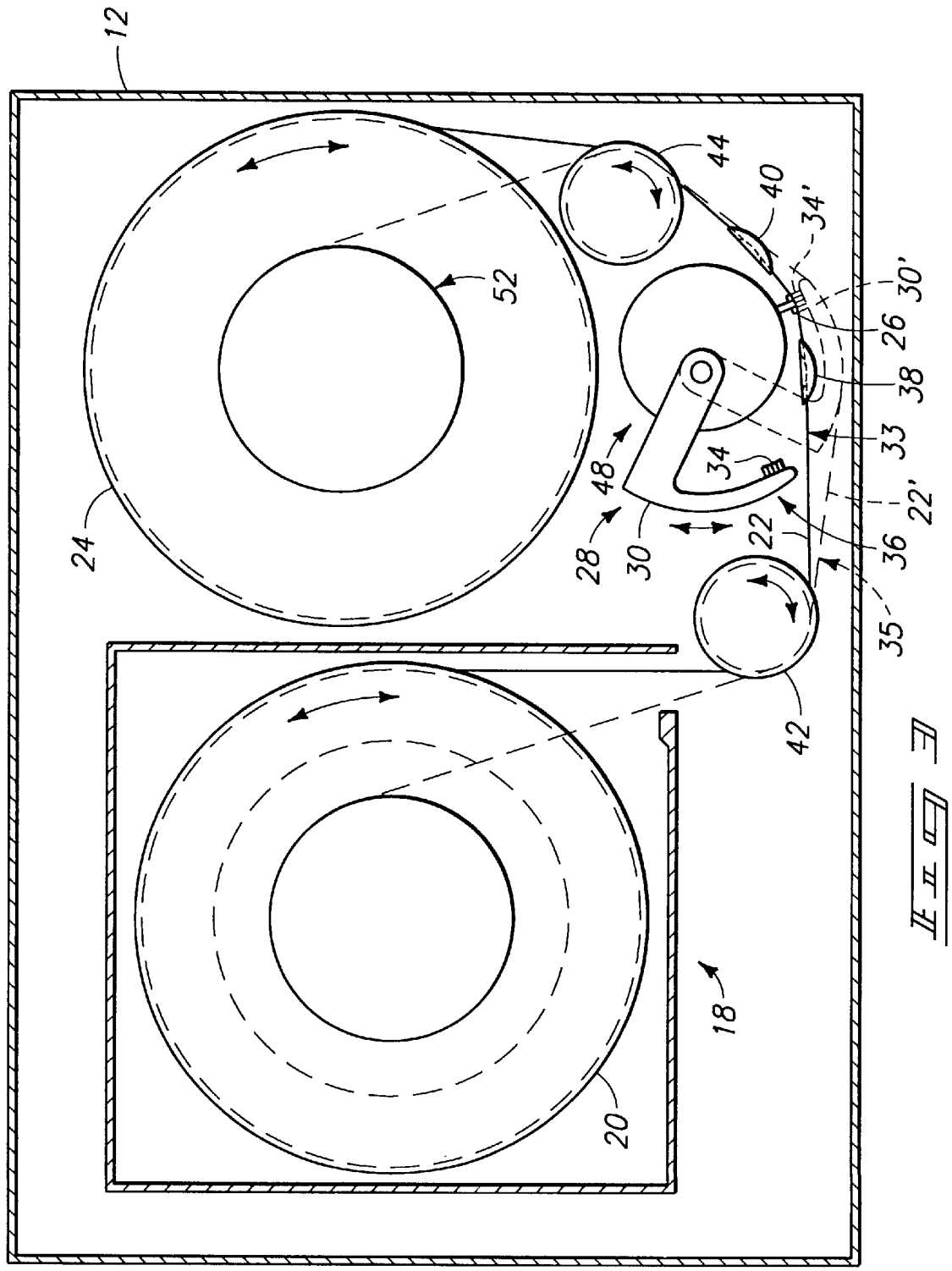
FIG. 3 is a plan view of the tape drive and data cartridge depicted in FIG. 2.

As shown in FIG. 2, head cleaning device 28 is formed from a support arm 30 that is carried for pivotal movement about pivot axis 32 such that tape 22 can be displaced from a travel position 33 to a retracted position 35 (see FIG. 3). Cleaning brush 34 is provided along a radial inner surface of arm 30 at a location such that pivotal movement of arm 30 imparts displacement to tape 22 as radial outer support surface 36 provides a tape displacement structure that biases tape 22 outwardly and away from head 26. Support surface 36 slides behind tape 22, causing tape 22 to be biased apart from transducer head 26. Such biasing enables room for cleaning brush 34 to be brought into contact with head 26 during a cleaning operation. Accordingly, brush 34 is pivotally positioned by arm 30 for placement directly in contact with head 26. While brush 34 is positioned along head 26, head 26 is actuated by a motor (not shown) for up-and-down movement, transverse to the travel direction of tape 22, such that cleaning action is imparted between brush 34 and head 26.

According to one construction, cleaning brush 34 is formed from a statically dissipative, slightly conductive bristle material. One such bristle material comprises a reasonably conductive and soft nylon brush. Alternatively, a conductive carbon material can be utilized to form such cleaning brush. Further alternatively, stainless steel can be utilized to form cleaning brush 34. According to one implementation, cleaning brush 34 is oscillated one to two times per second while engaged with transducer head 26. Such action is carried out with sufficient duration to ensure cleaning of head 26.

As shown in FIG. 2, it is understood that head cleaning device 28 is actuated for movement so as to provide a tape displacement structure that biases tape 22 away from transducer head 26 such that brush 34 can impart cleaning action there along. However, it is also understood that other cleaning devices can be mounted to a tape displacement structure in order to impart cleaning to a transducer head. Furthermore, it is understood that a tape displacement structure can be provided for biasing the tape away from the transducer head, while a separate cleaning device is brought in to contact with the head for imparting cleaning action there along. Irrespective of the structural implementation, the important concept related to this invention is directed to the movement of tape 22 away from head 26 while cleaning is imparted to head 26 by a cleaning structure such as head cleaning device 28, while tape 22 remains loaded into tape drive 12. Hence, there is no need to unload tape 22 and data cartridge 18 from tape drive 12 during a cleaning operation.

According to FIG. 2, magnetic tape head 26 is shown supported for up-and-down movement by a linear actuator 48. Actuator 48 is shown in simplified form as a cylindrical body in FIG. 2, with an actuator housing 50 providing a pivotal support structure for arm 30. It is understood that actuator 48 can be formed from any of a number of constructions presently understood in the art, wherein a linear-magnet displacement member enables movement of head 26 transverse to the travel direction of tape 22 such that read/write head sensing elements on head 26 can be properly positioned onto tracks of information contained on tape 22. Actuator 48 is also implemented to position read/write head elements on head 26 along tape 22 during normal tape drive operation.

According to the implementation depicted in FIG. 2, actuator 48 is used to impart up-and-down movement of head 26 while it is engaged with brush 34 so as to provide scrubbing action therebetween. Such scrubbing, or cleaning, action can be imparted without spooling the tape back into cartridge 18, so it is much faster than prior art methods described previously.

Although head cleaning device 28 is shown configured with an integrally formed slider surface 36 and a brush 34, it is to be understood that other types of linkages can be used to move tape 22 away from head 26. For example, a four-bar linkage, or a slider cam mechanism, can be used to impart retracted motion of tape 22 from head 26.

In order to retract or bias tape 22 and position brush 34 for cleaning action against head 26, arm 30 is powered for pivotal movement between the retracted position for arm 30 shown in FIG. 3, and a tape-biasing position illustrated as arm 30' in FIG. 3. One technique to power arm 30 for pivotal movement is to drive arm 30 with an existing motor that is provided within tape drive 12. For example, a tape cartridge load motor can be used to drive a cam that engages a cleaning arm after tape cartridge 18 is loaded into tape drive 12. Alternatively, other separate or dedicated motors can be utilized to pivotally move arm 30 between arm positions 30 and 30', as shown in FIG. 3.

It is understood that the novelty of this invention lies in having a device capable of moving tape 22 away from head 26 without requiring the unloading of tape 22 from tape drive 12, or retraction of tape 22 into tape cartridge 18. Accordingly, cleaning can be imparted to head 26 without having to spool a tape back into its cartridge.

As shown in FIG. 3, tape 22 is supported by a tape carrier comprising reel 20 and reel 24, extending between data cartridge 18 and the support structure mechanisms of tape drive 12. Furthermore, roller guides 42, 44 and stationary guides 38, 40 cooperate to deliver tape 22 along a travel position 34 situated directly against tape head 26. Pivotal movement of arm 30 causes slider surface 36 to bias tape 22 into a retracted position 35 illustrated by tape 22'. The pivotal positioning of arm 30 into the positioning of arm 30' retracts tape 22 from head 26 such that brush 34' is placed into direct contact with head 26 where cleaning action can be imparted by reciprocating, or moving, head 26 up and down via operation of actuator 48. As shown in FIG. 3, actuator 48 is illustrated in one construction as a linear actuator. However, it is understood that any commercially available construction for a linear actuator for moving a head can be used in the alternative.

As shown in FIG. 3, it is understood that tape 22 includes leaders (not shown) and a leader block assembly 52 which enables loading and unloading of tape 22 during loading and unloading of data cartridge 18 within tape drive 12. Details of many different types of leader block assemblies are well understood in the art and are not disclosed herein in any further detail as they do not relate to the novel aspects of this invention. One such leader block assembly is disclosed in U.S. patent application Ser. No. 09/010,418, filed on Jan. 21, 1998, and entitled "Tape Block and Take-up Reel Assembly for a Magnetic Tape Transport System". This U.S. patent application Ser. No. 09/010,418 is herein incorporated by reference. It is understood that any one of a number of commercially available leader block assemblies can be used with a tape drive implementing the features of this invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A tape drive, comprising:
    a transducer head configured to read information from a data tape that is received by the tape drive;
    a tape carrier configured to deliver the data tape in association with the transducer head along a tape travel path;
    a tape displacement structure configured to bias a received data tape away from the transducer head; and
    a cleaning device configured to engage the transducer head for cleaning when the data tape is biased from the transducer head, the cleaning device and the transducer head cooperating to enable cleaning of the transducer head without removal of the data tape, wherein the cleaning device comprises a cleaning brush carried by the tape displacement structure.

2. The tape drive of claim 1 further comprising at least one tape guide configured to present the data tape for movement along the transducer head so as to define the tape travel path.

3. The tape drive of claim 2 wherein the tape guide comprises a pair of stationary tape guides provided on either side of the transducer head.

4. The tape drive of claim 2 wherein the tape guide comprises a pair of rotatable tape guides provided on either side of the transducer head.

5. The tape guide of claim 1 wherein the transducer head comprises a magnetic read/write head.

6. The tape drive of claim 1 wherein the tape displacement structure comprises a support arm pivotally carried by the tape drive and having a radial outer support surface configured to mate with and bias the data tape, and a cleaning brush provided along a radial inner portion of the arm and configured to clean the transducer head.

7. The tape drive of claim 1 further comprising an actuator configured to support the transducer head for movement transverse to the tape travel path when the cleaning device is engaged with the transducer head.

8. The tape drive of claim 1 wherein the tape displacement structure comprises a support arm pivotally carried by the tape drive to engage the data tape and bias the data tape away from the transducer head to enable the cleaning device to engage the transducer head for cleaning.

9. The tape drive of claim 1 wherein the tape displacement structure comprises a support surface provided on a support arm configured to displace the data tape so as to separate the data tape from the transducer head and enable the cleaning device to engage the transducer head.

10. A self-cleaning linear tape drive, comprising:
    a magnetic head configured to read information from data tapes that are supported by the tape drive;
    a tape carrier configured to movably support a data tape for travel across the magnetic head extending along a travel path; and
    a head cleaning device including a tape displacement structure configured to separate the data tape from the magnetic head and a cleaning apparatus configured to engage the magnetic head for cleaning while the data tape is biased from the transducer head, wherein the cleaning apparatus comprises a cleaning brush carried by the tape displacement structure.

11. The tape drive of claim 10 wherein the tape carrier comprises at least one tape reel configured for storing the data tape.

12. The tape drive of claim 10 wherein the tape carrier comprises a pair of guides configured to deliver the data tape for engagement with the magnetic head extending along the travel path, the cleaning device configured to bias the tape from the travel path so as to facilitate cleaning of the magnetic head with the cleaning device.

13. The tape drive of claim 10 wherein the cleaning device comprises a substantially conductive nylon brush.

14. The tape drive of claim 10 wherein the cleaning apparatus comprises a brush formed from a statically dissipative, slightly conductive material.

15. The tape drive of claim 10 further comprising a linear actuator configured to carry the magnetic head for movement laterally of the travel path for the data tape carried in association with the magnetic head.

16. A method for cleaning a transducer head of a linear tape drive, comprising the steps of:
    presenting a data tape in contact with a transducer head of a tape drive so as to extend along a travel path;
    urging the data tape away from the transducer head using a tape displacement structure; and
    in combination with urging the data tape away from the transducer head, cleaning the transducer head with a cleaning brush carried by the tape displacement structure.

17. The method according to claim 16 further comprising the step of, after cleaning the transducer head, returning the data tape to the travel path such that the data tape re-engages the transducer head.

18. The method in accordance with claim 16 wherein the step of urging the data tape away from the transducer head comprises pivoting a tape displacement structure into engagement with the data tape positioned along the travel path so as to reposition the data tape into a retracted position such that a cleaning device can be configured to engage the transducer head.

19. The method in accordance with claim 18 further including a step of moving the cleaning device while engaged with the transducer head to impart cleaning to the transducer head.

* * * * *